Aug. 5, 1958 G. WIKKENHAUSER 2,846,674
REMOTE INDICATING APPARATUS
Filed Oct. 27, 1954 2 Sheets-Sheet 1

INVENTOR
G. WIKKENHAUSER
BY
ATTORNEYS

Aug. 5, 1958  G. WIKKENHAUSER  2,846,674
REMOTE INDICATING APPARATUS
Filed Oct. 27, 1954  2 Sheets-Sheet 2

INVENTOR
G. WIKKENHAUSER
BY
Moore & Hall
ATTORNEYS

United States Patent Office 2,846,674
Patented Aug. 5, 1958

2,846,674
REMOTE INDICATING APPARATUS

Gustav Wikkenhauser, Hillingdon, Glasgow, Scotland, assignor to Kelvin & Hughes Limited, Hillingdon, Glasgow, Scotland Application October 27, 1954, Serial No. 465,079

5 Claims. (Cl. 340—209)

This invention relates to remote indicating apparatus.

In the specification of my U. S. Patent No. 2,698,428, copending therewith, is described such an apparatus in which the transmitter comprises a disc or shield disposed in a liquid electrolyte between a segmented or divided electrode on one side thereof and a non-segmented electrode on the other side thereof, the electrodes being connected to a remote indicating device and to a source of electric current whereby the position of the disc or shield determines the current distribution between the non-segmented electrode and the parts of the divided electrode thereby controlling the remote indicating device.

The main objects of the present invention are to provide an improved apparatus in which greater accuracy is achieved and the construction of the apparatus is facilitated.

According to the present invention a remote indicating apparatus comprises a container containing a liquid electrolyte, a pair of current input electrodes fixed in the container, a divided electrode fixed between the input electrodes with the parts of the divided electrode electrically insulated from each other, a movable shutter blade between the divided electrode and one electrode, a second movable shutter between the divided electrode and the other input electrode, the shutters being mounted for rotation on a common axis the shutters being offset from each other about said axis, the parts of the divided electrode being connected to the windings of a receiver. The same alternating current is preferably fed to the input electrodes and to the rotor of the receiver.

The symmetrical arrangement of the input electrodes with respect to the divided electrode gives greater accuracy. Also a more constant saturation of the receiver rotor is obtainable which again provides increased accuracy. The invention also avoids the necessity for an electrical connection to the centre of the start winding of the receiver. By means of the invention it is possible to drive the receiver without introducing electric amplification between the transmitter and receiver. The invention enables the apparatus to operate satisfactorily with a 40 to 100 (e. g. 50) cycle per second input current.

The invention will now be described by way of example with reference to the accompanying diagrammatic drawings wherein.

Figure 1:
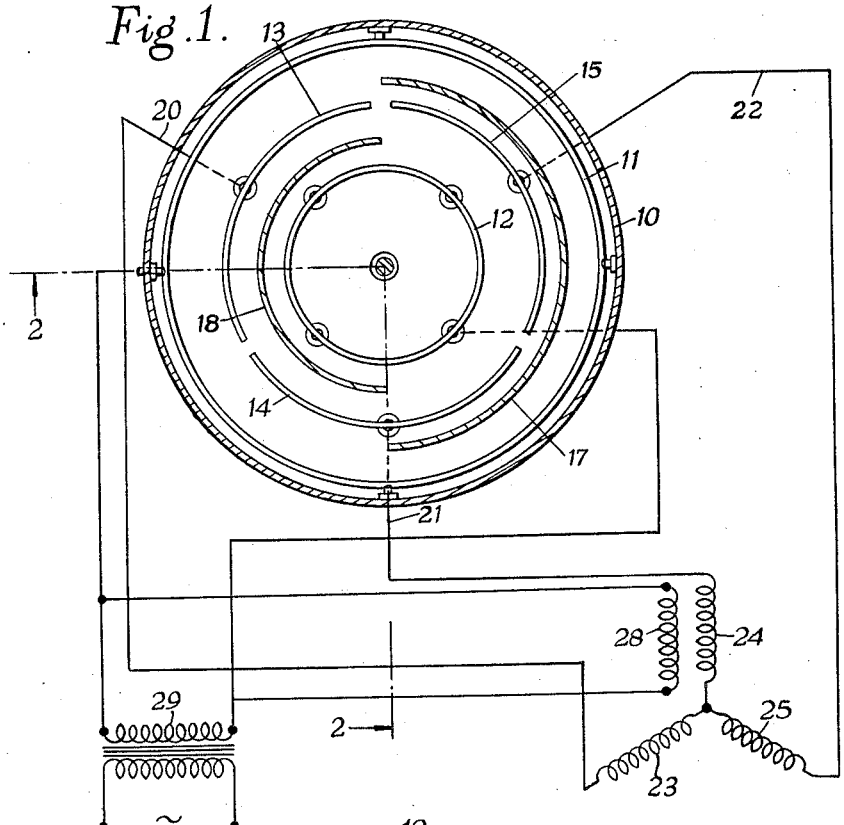
Figure 1 is an axial view of a transmitter made in accordance with the invention together with a circuit diagram of the receiver and connections thereto.
Figure 2:
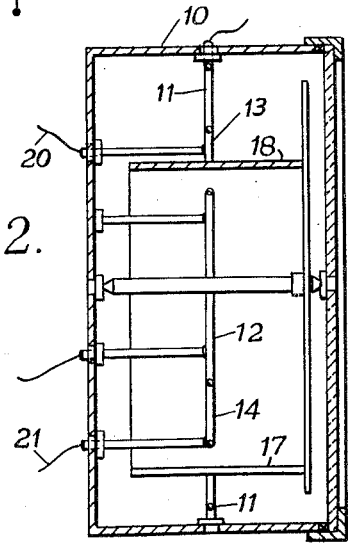
Figure 2 is a sectional view on the line 2—2 on Figure 1.

The transmitter shown in Figures 1 and 2 comprises a container or bowl 10 which is filled with a liquid electrolyte, a cylindrical outer input electrode 11, and a cylindrical inner electrode 12. The electrodes 11, 12 are fixed in the bowl 10. Between the inner and outer electrodes 11, 12 is a divided electrode having three conductive segments 13, 14, 15 insulated from each other forming a substantially cylindrical member fixed to the bowl 10, each segment extending around about 120°. A semi-cylindrical shutter 17 is disposed between the outer electrode 11 and the divided electrode, and a semi-cylindrical shutter 18 is disposed between the inner electrode 12 and the divided shutter. All these parts are coaxial with each other. The shutters are offset from each other 180° and are connected together and mounted for rotation about the axis of the transmitter and for example are carried by a compass card. The electrode segments 13, 14, 15 are connected by conductor wires 20, 21, 22 to the windings 23, 24, 25 of a 3 star stator of a synchro type receiver, the rotor winding 28 of which has its ends connected to the opposite poles of a secondary coil 29 of a transformer the primary coil 30 of which is connected to an alternating current input of for example 50 cycles per second. The coil 29 also has its ends connected respectively to the input electrodes. Thus as the shutters rotate the transmission of current through the electrolyte from the input electrodes to the divided electrode segments is distributed according to the position of the shutters and current correspondingly distributed to the windings 23, 24, 25 so as to establish a magnetic field which corresponds to the position of the shutters and which is exactly followed by the rotor winding 28.

Figure 3:
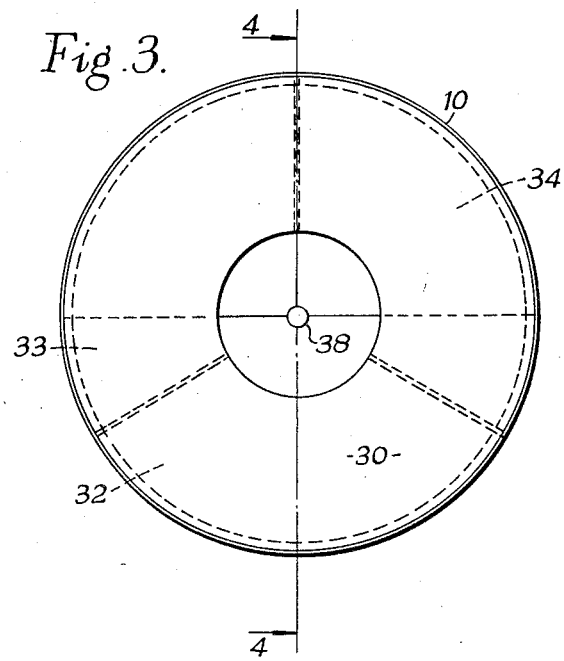
Figure 3 is an axial view of an alternative form of transmitter.
Figure 4:
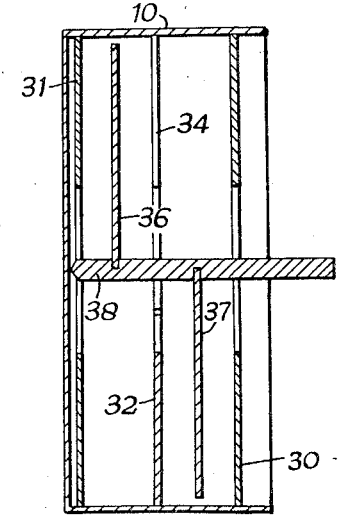
Figure 4 is a sectional view on the line 4—4 on Figure 2.

In the transmitter shown in Figures 3 and 4, the input electrodes 30, 31 are flat cylindrical discs fixed in the bowl 10. The divided electrode is in the form of a disc fixed to the bowl and having three segments 32, 33, 34 each extending around nearly a 120° angle. These segments will be connected to the receiver stator windings as before. The shutters 36, 37 are semicircular plates carried on a common spindle 38 which is mounted rotatably in the bowl 10 and carries a compass card which may be floated in or above the liquid electrolyte in a konwn manner, if desired. The shutters and electrodes are coaxial with the spindle 38. The shutters are offset from each other 180°. The action is the same as with the cylindrical type.

I claim:

1. A remote indicating device comprising a container containing a liquid electrolyte, a pair of current input electrodes fixed in the container, a divided electrode fixed between the input electrodes with the parts of the divided electrode electrically insulated from each other, a movable shutter blade between the divided electrode and one electrode, a second movable shutter between the divided electrode and the other input electrode, the shutters being mounted for rotation on a common axis the shutters being offset from each other about said axis, the parts of the divided electrode being connected to the windings of a receiver.

2. A remote indicating device as claimed in claim 1 wherein the same alternating current is fed to the electrodes and to the rotor of the receiver.

3. A remote indicating device as claimed in claim 2 wherein the current is of 40 to 100 cycles per second.

4. A remote indicating device as claimed in claim 2 wherein the shutters are semi-cylindrical plates offset approximately 180° from each other, the divided electrode has three segments of nearly 120° angle around said axis connected to the windings of a 3-star winding stator of a "synchro" type receiver, the input electrodes being discs each extending 360° around said axis.

5. A remote indicating device as claimed in claim 2 wherein the input electrodes are cylindrical and co-axial, the shutters are semi-cylindrical and coaxial with the electrodes, and the divided electrode is substantially cylindrical but having segments each extending around nearly 120° angle and connected to the windings of a 3-star winding stator of a "synchro" type receiver.

References Cited in the file of this patent

UNITED STATES PATENTS

| | | |
|---|---|---|
| 2,225,032 | Carbonara | Dec. 17, 1940 |
| 2,698,428 | Wikkenhauser | Dec. 28, 1954 |